US012689834B2

(12) United States Patent
Lowe

(10) Patent No.: US 12,689,834 B2
(45) Date of Patent: Jul. 21, 2026

(54) APPARATUS AND METHOD FOR IMAGING

(71) Applicant: MBDA UK LIMITED, Stevenage (GB)

(72) Inventor: Antony Joseph Frank Lowe, Filton Bristol (GB)

(73) Assignee: MBDA UK LIMITED, Stevenage (GB)

( * ) Notice: Subject to any disclaimer, the term of this patent is extended or adjusted under 35 U.S.C. 154(b) by 26 days.

(21) Appl. No.: 18/716,771

(22) PCT Filed: Dec. 2, 2022

(86) PCT No.: PCT/GB2022/053073
§ 371 (c)(1),
(2) Date: Jun. 5, 2024

(87) PCT Pub. No.: WO2023/105198
PCT Pub. Date: Jun. 15, 2023

(65) Prior Publication Data
US 2025/0039551 A1      Jan. 30, 2025

(30) Foreign Application Priority Data

Dec. 6, 2021   (EP) ..................................... 21275179
Dec. 6, 2021   (GB) ..................................... 2117599

(51) Int. Cl.
*H04N 23/00*        (2023.01)
*F41G 7/22*         (2006.01)
(Continued)

(52) U.S. Cl.
CPC ......... *H04N 23/698* (2023.01); *F41G 7/2293* (2013.01); *G02B 26/0875* (2013.01); *H04N 23/20* (2023.01); *H04N 23/58* (2023.01)

(58) Field of Classification Search
CPC ...... H04N 23/698; H04N 23/20; H04N 23/58; H04N 5/33; F41G 7/2293; G02B 26/0875;
(Continued)

(56) References Cited

U.S. PATENT DOCUMENTS 5,663,825 A      9/1997   Amon et al.
5,970,162 A  *  10/1999   Kawashima ........... H04N 7/142
                                                    348/14.05
(Continued)

FOREIGN PATENT DOCUMENTS

CN        105592269 A      5/2016
WO      2004084542 A1     9/2004
WO      2021069873 A1     4/2021

OTHER PUBLICATIONS

Knüttel et al., "Low-coherence reflectometry for stationary lateral and depth profiling with acousto-optic deflectors and a CCD camera," Opt. Lett. 19, 302-304 (1994).*
(Continued)

*Primary Examiner* — Frank F Huang
(74) *Attorney, Agent, or Firm* — Scully, Scott, Murphy & Presser, P.C.

(57)          ABSTRACT
Apparatus and method for compiling an image is disclosed. The apparatus comprises a deflector, a detector, and a processor. The deflector is operable to deflect light incident thereon by a controllable angular deflection, and is arranged to receive light from a moveable field of view within a field of regard by controlling the angular deflection. The detector is arranged to receive deflected light and output an image component composed from the deflected light. The processor is arranged to control the angular deflection to select a part of the field of regard to be received at the detector, and to receive a sequence of such image components from the detector. The apparatus is configured to receive each image
(Continued)

component passively, and the processor is operable to compile the sequence of image components to form a composite image of at least a part of the field of regard.

33 Claims, 7 Drawing Sheets

(51) Int. Cl.

| | |
|---|---|
| *G02B 26/08* | (2006.01) |
| *H04N 23/20* | (2023.01) |
| *H04N 23/58* | (2023.01) |
| *H04N 23/698* | (2023.01) |

(58) Field of Classification Search
CPC .. G02B 27/648; G02F 1/33; G01J 5/07; G01J 5/0871
See application file for complete search history.

(56) References Cited

U.S. PATENT DOCUMENTS

| | | | | |
|---|---|---|---|---|
| 6,184,781 | B1* | 2/2001 | Ramakesavan | B60Q 1/52 |
| | | | | 348/148 |
| 7,103,545 | B2* | 9/2006 | Furuta | E02F 9/26 |
| | | | | 704/275 |
| 7,466,337 | B2* | 12/2008 | Sawada | E02F 9/0858 |
| | | | | 348/148 |
| 7,640,107 | B2* | 12/2009 | Shimizu | B60Q 1/484 |
| | | | | 382/104 |
| 8,203,702 | B1 | 6/2012 | Kane et al. | |
| 9,332,229 | B2* | 5/2016 | Ishimoto | G06V 20/58 |
| 9,519,832 | B2* | 12/2016 | Lee | B60R 1/27 |
| 2003/0122930 | A1* | 7/2003 | Schofield | B60R 1/23 |
| | | | | 348/E7.086 |
| 2003/0222793 | A1* | 12/2003 | Tanaka | B60Q 9/004 |
| | | | | 348/148 |
| 2008/0247745 | A1 | 10/2008 | Nilsson | |
| 2010/0013906 | A1 | 1/2010 | Border et al. | |
| 2010/0118146 | A1* | 5/2010 | Schofield | B60R 1/30 |
| | | | | 348/148 |
| 2010/0245577 | A1* | 9/2010 | Yamamoto | B60R 1/27 |
| | | | | 348/148 |
| 2011/0285848 | A1* | 11/2011 | Han | B60R 1/27 |
| | | | | 348/148 |
| 2012/0069153 | A1* | 3/2012 | Mochizuki | B60R 1/27 |
| | | | | 348/148 |
| 2012/0081511 | A1 | 4/2012 | Kasunic et al. | |
| 2013/0016179 | A1 | 1/2013 | Birkbeck et al. | |
| 2013/0088567 | A1 | 4/2013 | Fitzpatrick et al. | |
| 2016/0065807 | A1 | 3/2016 | McClanahan | |
| 2020/0097617 | A1* | 3/2020 | Zhilinsky | G06T 11/00 |
| 2021/0041712 | A1 | 2/2021 | Bilik et al. | |

OTHER PUBLICATIONS

International Search Report and Written Opinion dated Feb. 7, 2023 issued in PCT/GB2022/053073.

GB Search Report dated Feb. 25, 2022 issued in GB 2117599.7.

Extended European Search Report dated May 9, 2022 issued in EP 21275179.6.

Anonymous, "Compressed sensing Wikipedia" Oct. 26, 2021 (Oct. 26, 2021), pp. 1-15, XP093017424, Retrieved from the Internet: URL:https//en.wikipedia.org/w/index.php?title=Compressed_sensing &oldid=1051903751 [retrieved on Jan. 25, 2023].

Gupta, Neelam et al., "Longwave infrared tunable notch filters", Proc. SPIE 11723, Image Sensing Technologies: Materials, Devices, Systems, and Applications VIII, (Apr. 12, 2021), available from https://doi.org/10.1117/12.2596261, pp. 117230B-1-117230B-8.

Combined Search and Examination Report dated Jun. 1, 2023 received in Application No. GB 2218167.1.

Examination Report dated May 13, 2025 received in Application No. GB 2218167.1.

* cited by examiner

Fig. 3
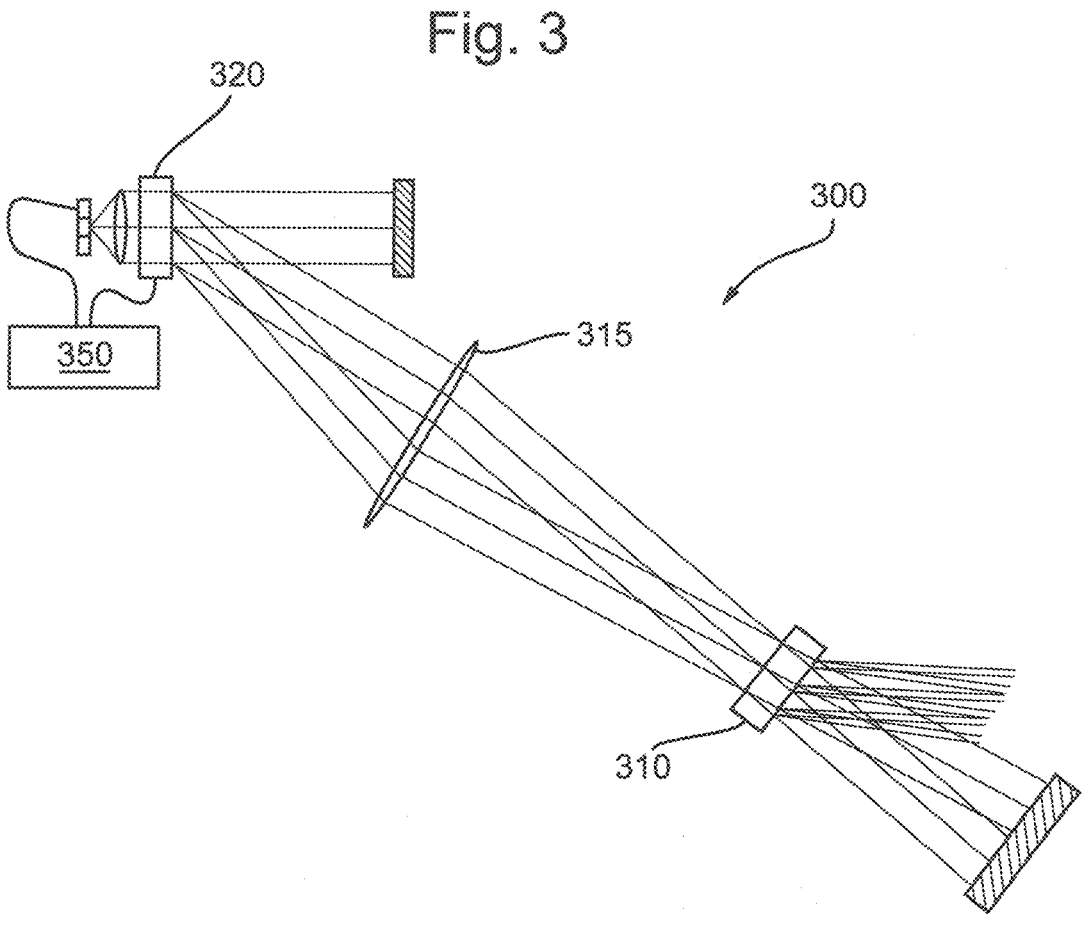
Fig. 4a                    Fig. 4b
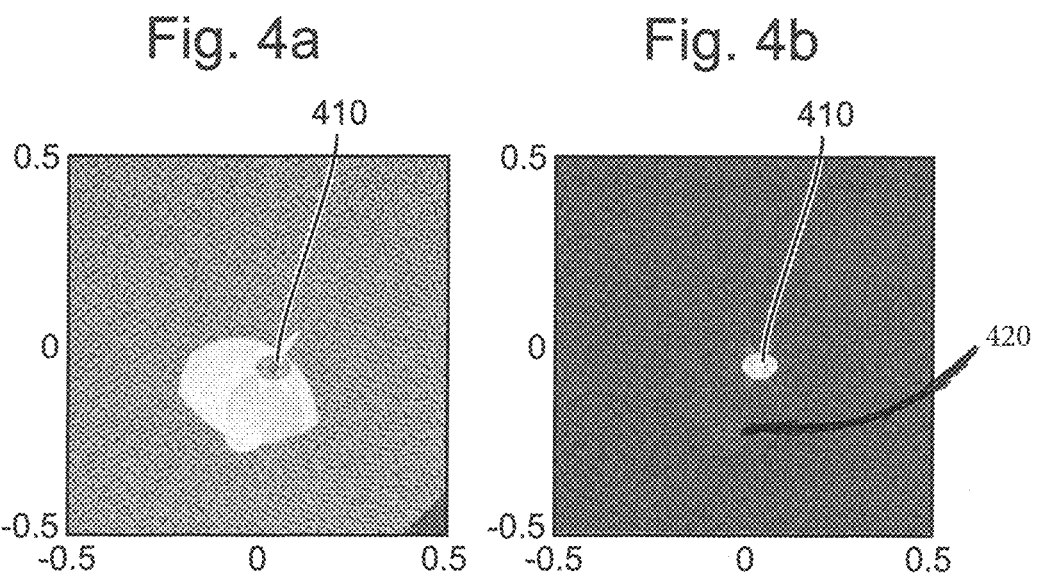

APPARATUS AND METHOD FOR IMAGING

FIELD OF THE INVENTION

This invention relates to an apparatus and method for imaging, more particularly to an apparatus and method for passive imaging.

BACKGROUND OF THE INVENTION

Various systems and methods for imaging are known. In conventional systems it is often necessary to make a trade-off between various key parameters, such as image size, capture rate, contrast, resolution, and acceptable noise levels. These parameters are typically determined at the design stage for the imaging apparatus, so that current systems can be limited in terms of their flexibility to be used for different applications.

For example, if the system is to be used to capture an image of a particular subject, that subject may be well-resolved, but too faint to distinguish from the noise. Alternatively, the subject may be bright enough to distinguish, but too poorly resolved for the image to be useful. If the subject is moving, it may be moving so irregularly, and quickly, that it cannot be re-identified from frame to frame as the same object to be tracked. It may be that the search field of regard is too small to capture the subject. With a conventional system, a subject failing in respect of any of the above criteria could not be usefully imaged. There is therefore a need for more flexible imaging systems.

SUMMARY OF THE INVENTION

In accordance with a first aspect of the present invention there is provided apparatus for compiling an image, the apparatus comprising: a deflector operable to deflect light incident thereon by a controllable angular deflection and arranged to receive light from a field of view, which field of view is moveable within a field of regard by controlling the angular deflection; a detector arranged to receive deflected light from the deflector and operable to output an image component composed from the deflected light; and a processor arranged to control the angular deflection so as to select a part of the field of regard to be received at the detector, thereby selecting the size and/or position of the image component within the field of regard; and to receive a sequence of such image components from the detector; wherein the apparatus is configured to receive each image component passively, and wherein the processor is operable to compile the sequence of image components to form a composite image of at least a part of the field of regard.

By passive, it will be understood that the apparatus is operable to output an image of a scene without any additional illumination being applied to the scene. The term passively will be interpreted accordingly. Passive techniques result in a number of advantages for an imaging system. No active illumination, such as a laser, is required. This results in reduction in size, cost and power requirements for the imaging apparatus. Passive systems can have longer ranger, because they are limited by a $1/r^2$ law, whereas an active systems range is limited by a $1/r^4$ law. In addition, emission signatures, which can carry valuable information, can be detected. For example, using the exemplary long wavelength infrared system described in further detail below, the difference between an active truck, with a hot bonnet, and an inactive truck, with a cool bonnet, can be detected. An active system will only detect radiation that is reflected back to it.

For missile seeker applications, this enables the difference between a real and a dummy target to be detected; or for the direction of flight of an aircraft to be inferred from detection of the end at which a hot jet lies. More broadly, for passive systems, hot objects are generally more visible through foliage and camouflage than for active systems.

Each image component to be compiled into the composite image can be individually selected and configured during use of the imaging apparatus, resulting in greater flexibility in how the apparatus can be used. For example, a standard imaging detector may consist of a rectangular array of many thousands or millions of pixels. A small or distant object may cover only a few pixels of that detector. Each image produced by that detector would therefore include a large amount of unnecessary information arising from the large amount of background. Using an imaging apparatus according to the present invention, only the relevant part of the field of regard need be imaged. This can be used to make the frame capture rate higher, since the composite image will comprise fewer image components; or to increase the signal to noise ratio by increasing the staretime for each image component. Alternatively, it can be seen that by increasing the staretime, the range of the imaging apparatus can be increased. In addition, the apparatus is well-suited to use in conjunction with super-resolution algorithms, or with computational imaging techniques, because of the flexibility the apparatus offers in selecting image components.

The deflector may comprise one or more acousto-optic deflectors. Acousto-optic deflectors can alter the amount by which incident light is deflected rapidly. This supports rapid image acquisition for the imaging apparatus. The deflector may comprise two acousto-optic deflectors immediately adjacent one another. In this manner the imaging apparatus is operable to scan across a two dimensional field of regard. Alternatively, the deflector may comprise two spaced apart acousto-optic deflectors, and may further comprise a relay lens between the acousto-optic deflectors arranged to focus light deflected by one of the acousto-optic deflectors onto the other of the acousto-optic deflectors. The deflector may comprise a single acousto-optic deflector operable to deflect light across a two dimensional field of regard. An exemplary such acousto-optical deflector is disclosed in international patent application publication number WO2021069873A1.

The apparatus may further comprise one or more stops arranged to prevent light from the scene passing through one or more acousto-optic deflectors without deflection from reaching the detector. Such stops reduce noise reaching the detector. The one or more stops may comprise one or more mirrors arranged such that an image of the detector is formed at the detector. The image of the detector, in this case, is formed by rays originating at the detector and reflected back to it by the mirrors. Alternatively, the one or more stops may comprise an arrangement of mirrors configured to retrore-flect rays originating at the detector. The use of mirrors reduces noise arising from thermal radiation emitted by the stops.

The apparatus may further comprise a filter configured to filter light incident on the detector. The filter may be a variable filter. Use of a variable filter enables the imaging apparatus to obtain a multi-spectral signature of an object. This provides more target information than a broadband emission signature. The filter may comprise an etalon. The etalon may be tuneable, so as to provide a variable filter. Alternatively, the variable filter may be a filter wheel. Other types of variable filter exist and may also be used.

The detector may be configured to detect radiation in the long wavelength infrared band. The detector may be cooled.

The detector may comprise between one and one thousand pixels. The detector may comprise between one and four hundred pixels. The detector may comprise between one and one hundred pixels. The detector may comprise between one and ten pixels. It will be appreciated that, whilst the amount of information per image component increases as the number of detector pixels increases, the size of the detector also increases, potentially resulting in the need for a more complex optical system in order to reduce any angular aberration effects. It is expected that a small array of pixels, such as a 3 by 3 array, will be suitable for most applications. However, it is also envisaged that the detector may comprise a single pixel detector. The detector may comprise a number of pixels each operable to detect a different wavelength of electromagnetic radiation. In this way multispectral images can be obtained.

The deflector may be operable such that a first field of view recorded by a first image component is displaced from a second field of view recorded by a second image component by a non-integer number of pixels. The first and second field of views may overlap. The first field of view may be displaced from the second field of view by less than one pixel. Where the first and second image components overlap, subsequent image processing can be used to increase the resolution of the resulting composite image, potentially to a level greater than the maximum possible from one pixel of the detector. At least the detector and the deflector may be mounted on a gimbal.

The apparatus may further comprise an optical arrangement configured to alter the field of regard. An acousto optic deflector may typically be operable to deflect light through an angle of two to five degrees, and this will determine the field of regard of the imaging apparatus. In some applications a larger field of regard may desirable. Enlarging the field of regard can reduce the resolution obtainable. In other applications a smaller, higher resolution field of regard may be desirable. The optical arrangement may for example comprise an afocal telescope configured to expand the field of regard.

The apparatus may further comprise a sensor arranged to detect motion of the apparatus and to output detected motion to the processor; and wherein the processor is configured to control the angular deflection so as to compensate for the detected motion. For example, this may be useful if the apparatus is mounted on a moving vehicle, or if it used in a handheld system.

The invention extends to a seeker for a guided missile comprising the apparatus described above.

According to a second aspect of the invention, there is provided a passive imaging method for compiling an image, the method using apparatus comprising a detector arranged to receive deflected light from a deflector; the deflector being operable to deflect light incident thereon by a controllable angular deflection, and arranged to receive light from a field of view, which field of view is moveable within a field of regard by controlling the angular deflection; and the method comprising the steps of:

a) selecting a number of image components;
b) determining the deflection required to enable the detector to image each of said image components;
c) for each determined deflection, applying the deflection to light incident on the apparatus and using the detector to record the image component associated with the deflection; and
d) compiling the image components to form a composite image of at least a part of the field of regard.

The step of compiling the image components may comprise the use of a compressive imaging algorithm. The step of compiling the image components may comprise the use of a super-resolution algorithm. The method is particularly suited to work with compressive imaging techniques and super-resolution as a result of the ability to select each image component.

The composite image may be only a partial image of the field of regard. The composite image may comprise a plurality of partial images of the field of regard. In this way only parts of a scene that are of interest need be imaged.

The deflection may be varied during recording of at least one of the image components. The term 'staretime' is used herein to describe the time taken for capture of one image component. The staretime, which can be varied for different image components, is typically longer than the time needed to change the applied deflection. Altering the deflection during the staretime results in the size and/or shape of the image component being varied, and provides greater flexibility in application of the method. The term 'dwell time' is used herein to describe a time for which the deflection is held constant.

The deflection may take a number of discrete values during recording of said at least one of the image components such that said at least one of the image components relates to a set of discrete regions of the field of regard.

The deflection may be maintained at each discrete value for a dwell time, and the method may further comprise the step of selecting the dwell time for each of the discrete values. The dwell time may be the same for each of the discrete values. Alternatively the dwell time may differ between different discrete values.

The deflection may be varied continuously during recording of said at least one of the image components.

The deflection may take a number of discrete values during recording of at least one of the image components, and the deflection may be varied continuously during recording of at least another of the image components.

The step of selecting a number of image components may be performed whilst the scene is being imaged, such that a subsequent image component can be selected in dependence on information obtained about the scene from prior-obtained image components. Alternatively, a group of image components can be selected and captured before selecting the next group. The group may include all of the image components of a composite image. Each group, and therefore each composite image, could consist of image components of different shapes, in different positions, and of image components that are either continuously located adjacent one another, or discretely located across the field of regard.

The image components may comprise first and second sets of image components, wherein the first and second sets comprise a number of elongate parallel image components, and the image components of the second set intersect with those of the first set to form a grid. The grid may define a number of points located at intersections between image components in the first set and image components in the second set, and the method may further comprise the step of processing the image component values to determine constraints on the point values. This selection of image components is useful for imaging scenes in which it is known that there is a single target in an otherwise relatively uniform background.

The method may further comprise the step of selecting a staretime for the recording of each image component. This enables the dynamic range of the resulting composite image to be increased, since a relatively long staretime can be used to capture lower brightness image components, whilst a relatively short staretime can be used to capture higher brightness image components.

The invention extends to a method of capturing video, the video comprising a sequence of image frames, wherein each of the sequence of image frames is a composite image obtained using the method described above. In such video capture, the step of selecting the image components for one of the image frames may be performed in dependence on a preceding image frame. The step of determining the deflection required to enable the detector to image each of said image components for one of the image frames may comprise the steps of determining motion of the apparatus, and determining the deflection so as to compensate for the motion of the apparatus.

The method may further comprise the step of tracking a target in the sequence of image frames. The step of selecting the image components for one of the image frames may be performed in dependence on the motion of the tracked target determined from a number of preceding image frames.

The invention extends to a computer readable medium comprising instructions that when executed cause a processor to perform the method described above.

BRIEF DESCRIPTION OF THE DRAWINGS

Embodiments of the invention will now be described by way of example only and with reference to the accompanying drawings, of which:

FIG. 3 is a schematic illustration of an imaging apparatus according to a third embodiment of the invention;

FIGS. 4a and 4b illustrate the results of modelling to show the effect of noise in the imaging apparatus of FIG. 2;

DETAILED DESCRIPTION OF THE INVENTION

Figure 1:
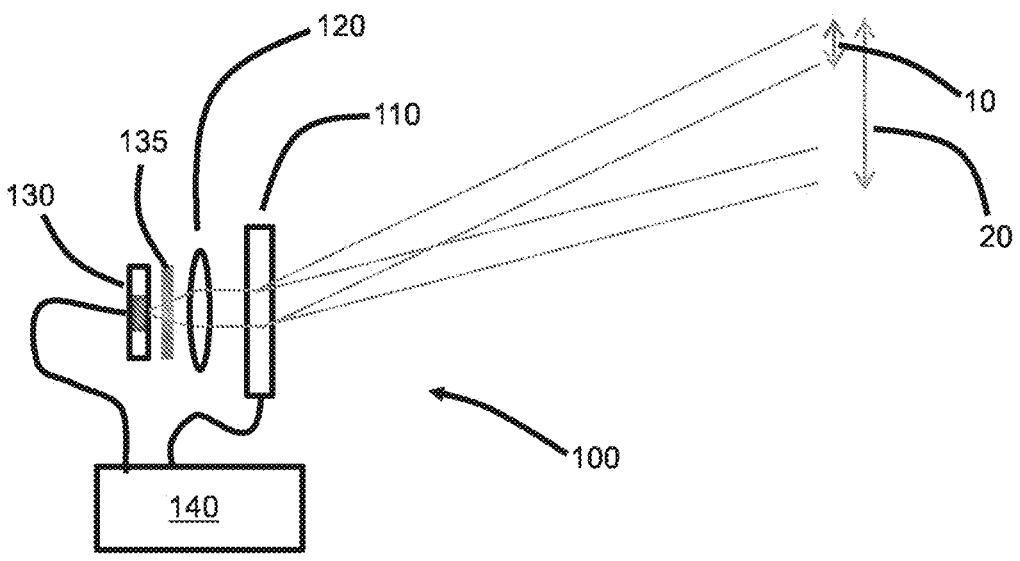
FIG. 1 is a schematic illustration of an imaging apparatus according to a first embodiment of the invention.

Referring firstly to FIG. 1, an apparatus 100 receives light from an external instantaneous field of view 10. In general terms, apparatus 100 compiles an image of all or part of a field of regard 20, which field of regard is wider than the field of view 10, by deflecting received light through a varying but controllable deflection, and compiling a sequence of images of different instantaneous fields of view to create a composite image of all or part of the field of regard. Image data is captured by a detector 130, the image capture time being the staretime. Since it is possible for the deflection to be altered during the staretime, whilst the captured image data may represent an image of an instantaneous field of view, it should be noted that the captured image data, with appropriate control of the deflection, may represent the combination of image data obtained from multiple points within the field of regard. In the following, the term 'image component' is used for the image data captured within one staretime, whether that image data relates to one specific location within the field of regard, or multiple such locations.

Apparatus 100 comprises a deflector 110 that is arranged to receive light from the external environment. The deflector is an acousto-optic deflector, which is operable to deflect the received light by an angular deflection the magnitude of which is controllable by varying the frequency of an acoustic excitation applied to the deflector. By varying the deflection, the field of view of the apparatus is moveable, as is schematically indicated in FIG. 1, across a field of regard 20.

Acousto-optic devices use acoustic waves passing through an optical medium to modulate or deflect light passing through the medium. Typically, a cuboid element of optical material is provided with a piezo-electric transducer on one face, and a layer of acoustic absorber material on the opposing face. The transducer can be operated to generate an acoustic wave in the element, which travels in the direction from the one face to the opposing face. This acoustic wave creates a series of compressions and rarefactions in the element in planes parallel to the first and second faces, and this series of compressions and rarefactions generates a similar pattern of positive and negative changes to the refractive index of the material, which, in turn, creates an effect similar to a diffraction grating. Part of the optical power of an input beam incident on one of the remaining faces is transferred into a new, deflected beam due to constructive interference of contributions from the diffraction of the input beam that occurs across a region in the optical material where the input beam and the acoustic wave interact. The deflected beam is a first order diffracted beam. The deflected beam and an un-deflected, zeroth order beam are emitted from the optical element at an output face opposing the input face.

The deflection is in the direction of propagation of the acoustic wave in the material. The proportion of energy in the deflected beam is greatest when the input beam is incident on a plane acoustic wave travelling in the optical material at the Bragg angle $\theta_B$ to the acoustic wavefront. The Bragg angle is given by:

$$\theta_B = \lambda/2\Lambda$$

where $\lambda$ is the wavelength of the light in the optical material, and $\Lambda$ is the wavelength of sound in the optical material. The size of the angle through which the beam is deflected can therefore be altered by varying the frequency of the acoustic wave generated by the transducers. It will be noted that the degree of deflection is dependent on the wavelength of the input beam.

Apparatus 100 is arranged such that the deflected beam from deflector 110 is focussed by objective lens 120 onto a detector 130. Detector 130 is a single element detector suitable for detecting light in the 8 μm to 12 μm wavelength range in the long wavelength infrared (LWIR) band. At this wavelength range black body radiation from objects at approximately ambient temperature is at a maximum. Operation in this wavelength range is therefore beneficial for a passive imaging system. The detector may be cooled so as to reduce noise. Whilst various known cooling techniques can be used, for a small, single element detector it may be possible to use a thermoelectric (Peltier) cooling system. A thermoelectric cooler has the advantage of being relatively small in size. In addition thermoelectric coolers do not use any moving parts which may require maintenance. Alternatively a Stirling engine or Joule-Thomson mini-cooler can be used.

Both detector and deflector are in communication with a processor 140. The processor is operable to control both the detector and the deflector. The processor hardware may be built specifically for the purpose of controlling apparatus 100, or, particularly if the apparatus 100 is to be operated in a missile or other aerospace or vehicle platform, may be firmware installed on a platform processor; or the processor may be a general purpose computer with software installed to control the apparatus 100 as described below.

Apparatus 100 can be controlled in a number of ways. For example, the processor can operate the deflector in combination with the detector to capture an image of an instantaneous field of view in one part of the field of regard during one staretime, and then increment the deflection applied by the deflector 110 to capture a sequence of image components of adjacent instantaneous fields of view so as to enable the processor to compile a composite image of the entire field of regard 20. The deflection increments may be selected so that the image components are uniformly spaced. The deflection increments may be selected so that the image components overlap to some extent, or may be selected to eliminate overlap. Elimination of overlap between the image components decreases the number of individual image components required to cover the composite image, thus decreasing the time taken to capture the composite image. Including some overlap between different image components may enable the processor to apply various known super-resolution algorithms to the areas of overlap, so as to improve the resolution of the resulting composite image. For example, iterative back projection or maximum likelihood methods can be used. Alternatively, where there is a known region of interest within the field of regard 20, a smaller number of individual image components of the smaller region of interest within the field of regard can be captured, enabling a faster (composite) frame rate than would be possible if a composite image across the full field of regard were to be obtained.

Apparatus 100 can therefore be configured, by applying different control regimes through processor 100, to operate in various different modes. If a high frame rate is desirable, the number of image components used to form a composite image can be reduced. The frame rate can thus be increased at the cost of a reduction in resolution or a reduction in the composite image size. If a high resolution is desirable, the amount of overlap between the image components can be increased so as to enable better performance of a subsequently applied super-resolution algorithm. Thus resolution can be increased at the cost of a reduction in composite image size or composite image capture rate.

The staretime for the detector can also be controlled for each image component. The staretime is the period over which the detector collects photons. For typical imaging systems the staretime is optimised for a given scene, and is dependent on the pixel well-size, characteristics of the optical components, and pixel size, amongst other things. For apparatus 100, the staretime can be varied between image components. Thus, if low noise images are desired, the staretime for each individual image component can be increased so as to reduce noise in the individual images. Conversely, a high frame rate can be obtained by reducing the staretime at the cost of increased noise. Alternatively, the staretime can be increased for selected image components, dependent for example on an area of interest within a scene, and decreased for others, so as to balance requirements for low noise and frame rate.

The staretime for long wave infrared detectors is typically between 10 μs and 100 μs. Typically, acousto-optic deflectors, such as deflector 110, can be addressed at 100 kHz or greater. Therefore, the deflection can be varied within the staretime to address multiple image points within one staretime. In effect this creates an image component with an extended shape, the shape being the combination of the image points addressed by the pointing angles selected by the deflections. Notably the image points need not be adjacent one another: it will be possible to address multiple discrete image points within one staretime, the resulting image component being the combined signal from each of the addressed image points. The length of time for which each discrete image point is imaged can also be varied, and will be referred to herein as a dwell time. Thus it will be understood that different image points captured within one staretime, and therefore forming one image component, may be captured with different dwell times. Such an extended image component may be useful in determining roughly where a region of interest may be located within the field of regard, so that subsequent composite frames can focus on interrogating only the region of interest.

Extended image components also enable further flexibility in control of the imaging apparatus 100, providing the ability to increase frame rate at the cost of non-uniformity of resolution across the composite image, or accepting a lower frame rate in order to obtain uniform resolution, or a higher resolution in one particular part of the composite image. For example, small, closely spaced image components can be captured in one part of the field of regard, whilst, in order to increase the frame rate, larger, more widely spaced image components can be captured in other parts of the field of regard. Where a relatively small part of the field of regard is of particular interest, such a control method enables high resolution of a region of interest to be combined with a relatively high frame rate.

Figure 2:
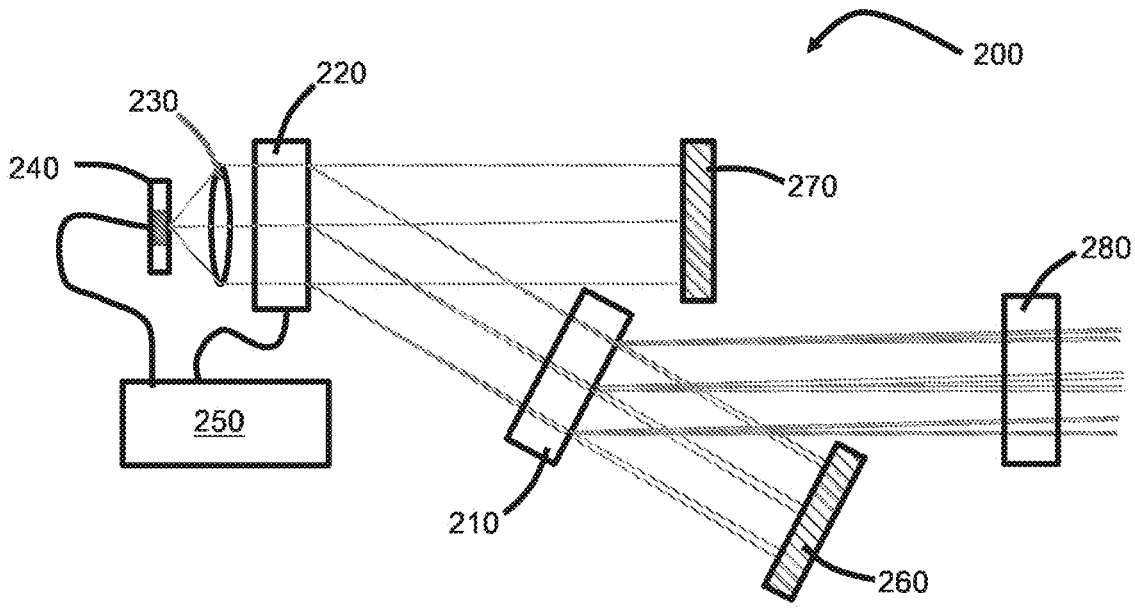
FIG. 2 is a schematic illustration of an imaging apparatus according to a second embodiment of the invention.

FIG. 2 is a schematic illustration of apparatus 200 for compiling an image from a number of image components. Apparatus 200 comprises first and second acousto-optic deflectors 210 and 220. Deflector 210 is arranged to receive light from the external environment. Deflector 220 receives the light deflected by deflector 210. Both deflectors 210 and 220 are operable to deflect received light by an angular deflection. The direction of the deflection applied by deflector 220 is perpendicular to the deflection applied by deflector 210. The magnitude of the deflections applied by the deflectors is controllable by varying the frequency of acoustic excitation applied to the deflectors. The deflection applied by deflector 210 can be controlled independently of the deflection applied by deflector 220. As will be explained in further detail below, the result is that the instantaneous field of view of apparatus 200 can be scanned across a two dimensional field of regard, so that a two dimensional composite image can be compiled.

Apparatus 200 is arranged such that the deflected beam from deflector 220 is focussed by objective lens 230 onto a detector 240. Detector 240 is a cooled LWIR detector, similar to that described above with respect to apparatus 100. A filter is used to ensure only a narrow wavelength band reaches the detector. Different arrangements of the deflectors 210, 220 are possible to enable the deflected beam to reach the detector 240. In a first arrangement, as illustrated in FIG. 2, deflectors 210 and 220 are positioned closely adjacent to one another such that the beam deflected by deflector 210 has not moved far from the axis of deflector 220 by the point at which it is incident on deflector 220, and remains within the input aperture of deflector 220. An alternative apparatus 300, illustrated in FIG. 3, includes a relay lens 315 between deflectors 310 and 320. The relay lens functions to cast an image of deflector 310 onto deflector 320. Therefore the relative positions and directions of the beam entering deflector 320 are essentially an inverted copy of the beam leaving deflector 310. In other respects, apparatus 300 is the same as apparatus 200 and is therefore not described further.

Apparatus 200 further includes mirrors 260 and 270 which function to reduce noise in the signal received at detector 240. Significant noise can obscure any image in the received signal, and any noise will reduce the available dynamic range of the apparatus, reducing the sensitivity of the apparatus. Deflectors 210 and 220 operate using the acousto-optic effect and, as described above, transmit light along two contributing beam paths. Light that is deflected at each deflector, so as to travel along the optical axis of the device, forms the signal from which the image is derived. Light that is un-deflected by deflector 210, and also light that is deflected by deflector 210 but is un-deflected by deflector 220, contains only noise photons originating either from a part of the scene of no interest, or from a part of the structure of apparatus 200. These noise photons impinge on the detector unless blocked, resulting in an unknown pedestal to the signal which degrades the image.

Baffles, placed at the positions of mirrors 260 and 270, can be used to block this light so as to mitigate this problem. Baffles themselves, however, also emit thermal radiation, resulting in a similar, though reduced, background noise level. This noise is however relatively constant across the field of regard of the apparatus. An image can therefore be obtained, either because the noise level is sufficiently reduced by the baffles to enable an image to be formed, or by using subsequent processing to subtract a constant background value.

Mirrors 260 and 270 function as baffles to block this unwanted radiation. In addition, although reflecting light incident thereon, the mirrors themselves emit relatively little radiation. Radiation that reaches the detector from these mirrors forms a collimated, focussed and retro-reflected image of the detector 240 itself. Since the detector 240 itself is cooled, its thermal emissions are very low. As a result, the background noise level is considerably reduced in comparison to that which would be obtained using simple baffles to block the unwanted radiation. Thus the vast majority of photons that fall on the detector originate from the scene of interest, and not from any other source. The properties of an optical system such as apparatus 200 have been modelled to simulate the effect of such noise photons. FIG. 4a illustrates the results of this modelling for apparatus 200 with standard baffles in place of mirrors 260, 270, whilst FIG. 4b illustrates the results of this modelling with the mirrors 260, 270 present. In both cases the useful image is the bright central spot 410. A faint ghost image 420 remains in FIG. 4b, but it can be seen that the overall noise levels in FIG. 4b are significantly lower than those seen in FIG. 4a, and that a significantly cleaner image is obtained with the mirrors 260, 270 present.

Figures 10A, 10B, 10C:
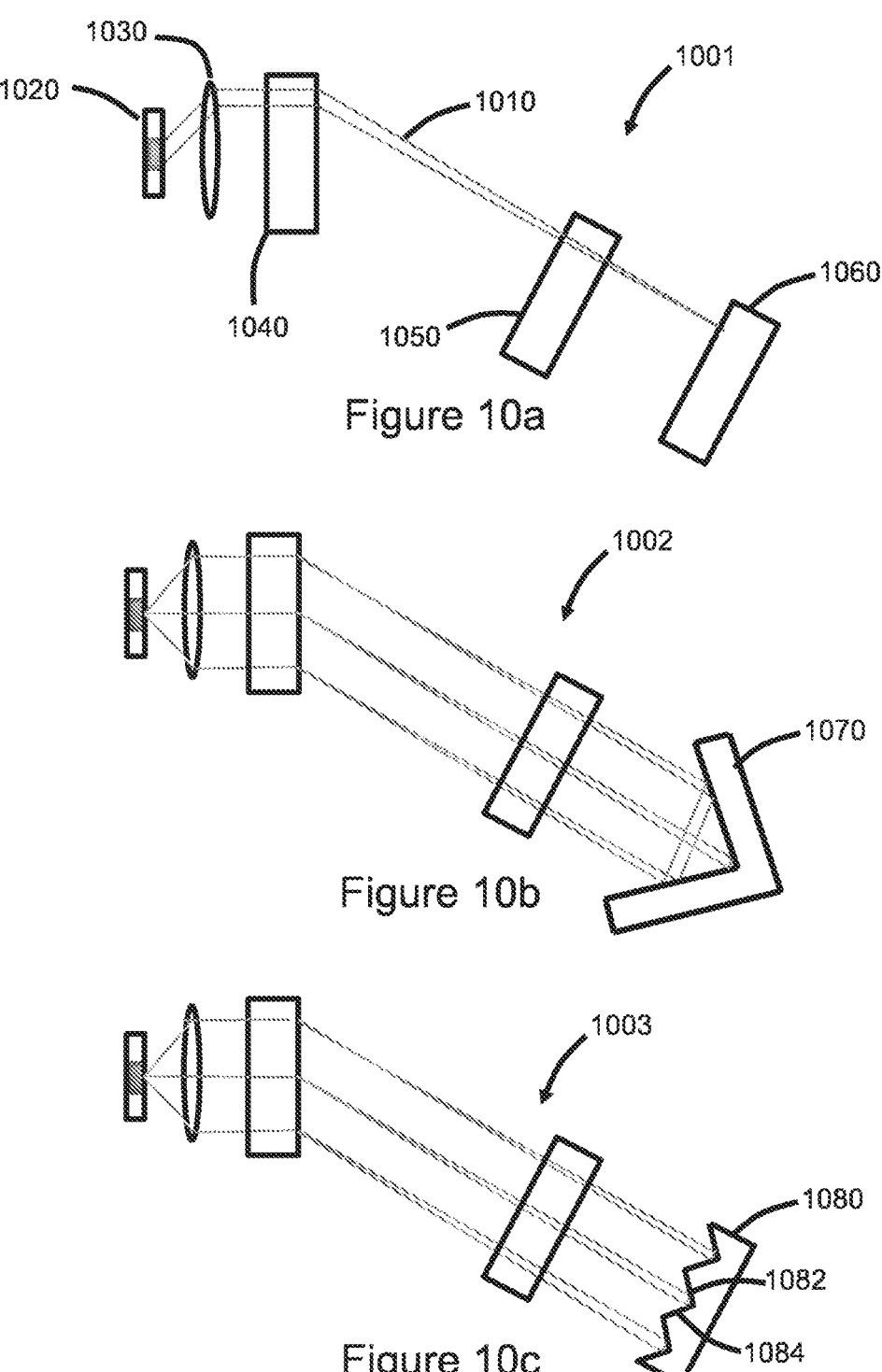
FIGS. 10a, 10b, and 10c are schematic illustrations of imaging apparatuses to show the effect of retro-reflection of the $0^{th}$ order beam.

Mirrors 260, 270 function effectively if rays originating from the detector are reflected to arrive back at the detector, for the reasons described above. However, it should be noted that these rays may not be reflected to arrive at the centre of the detector. This is because rays arrive at one of the deflectors at a range of angles as a result of deflection by the other. (It will be appreciated that this problem does not arise in alternative embodiments in which only one acousto-optical deflector is used). FIG. 10a illustrates this problem, showing an apparatus 1000 similar to apparatus 200. The path of an exemplary ray 1010 is illustrated. Ray 1010 originates at from detector 1020, and passes through lens 1030 to acousto-optic deflector 1040, where it is deflected. It passes through acousto-optic deflector 1050 without deflection and is reflected by baffle mirror 1060. Ray 1010 is only reflected back on itself if it is incident on mirror 1060 perpendicularly. As illustrated, if it is not perpendicular, it will be reflected back at a small angle, and does not return to the point from which it originated. Thermal noise will arise if it is possible for such a ray to return to a point off the detector. If, however, the apparatus is arranged so that these rays always land on a cooled surface, the mirrors will still function to reduce noise. For example, the detector may be located on a larger cooled substrate that surrounds the detector. Notably, however, the mirror effectively doubles the deflection, and so it is possible for a relatively large cooled substrate to be necessary.

It is also possible to replace mirror 260 with a retrore-flecting arrangement. FIGS. 10b and 10c illustrate exemplary retroreflecting arrangements that can be used for this purpose. Rays incident on a retroreflecting arrangement are reflected back to be parallel to their direction of incidence. FIG. 10b illustrates an apparatus 1002 in which a mirror arrangement 1070, comprising two mirrors positioned at right angles to one another, replaces mirror 1060 of apparatus 1001. This arrangement functions to retroreflect rays originating at the detector, albeit with some translational shift. In other respects apparatus 1002 is the same as apparatus 1001. It will be appreciated that a corner cube retroreflecting arrangement is not required, as it is only needed to compensate for deflection by one of the deflectors. If the translational shift is large, it can be accommodated by enlarging other components as appropriate.

Alternatively, in the apparatus 1003 illustrated in FIG. 9c, mirror 1060 is replaced by mirror arrangement 1080. In other respects apparatus 1003 is the same as apparatus 1001. Arrangement 1080 comprises a series of pairs of smaller mirrors. Each of the mirrors in one pair (such as mirrors 1082, 1084) are positioned at right angles to one another. The arrangement 1080 results in a smaller translational shift, at the cost of a more complex retroreflecting arrangement.

Imaging apparatus 200 further comprises an optical arrangement 280 positioned to receive light from the scene to be imaged and transmit that light to deflector 210. The purpose of optical arrangement 280 is to alter the field of regard of imaging apparatus 200, which otherwise would be determined by the maximum deflection that the deflectors 210, 220 could apply. Typically commercially available acousto-optic deflectors are operable to apply a deflection of between 2° and 5°. Optical arrangement 280 in the present embodiment comprises an afocal telescope arranged to magnify this deflection, thus expanding the field of regard. It is expected to be possible to expand the field of regard by up to a factor of ten in this way. It may be possible to expand the field of regard to a greater extent, though it will be appreciated that greater expansion of the field of regard may require more complex or heavier optical arrangements. Expanding the field of regard in this way lowers the resolution achievable by the detector. It may alternatively be appropriate for some applications to increase the achievable resolution by reducing the field of regard, using an alternative afocal telescope arrangement.

Both deflectors 210, 220 and the detector 240 are in communication with a processor 250. The processor is operable to control both deflectors and the detector. In contrast to apparatus 100, however, processor 250 can control the deflection in two dimensions. As a result a two dimensional image can be formed. As with apparatus 100, processor 250 can operate apparatus 200 in different modes so as to prioritise different characteristics of the compiled image, such as frame rate, resolution, or compiled image size, and analogous control methods to those described above can be used. Super-resolution algorithms can be used in order to improve the resolution of the compiled image, particularly where the image components are positioned so as to overlap. Other computational imaging techniques may also be used, for example Compressive Imaging, in which careful control of the size, shape and position of image samples can support the use of significant undersampling without significant image degradations. Image conditioning techniques may also be used, for example, to correct for any aberration introduced as the image components move across the field of regard. Such aberrations are likely to be repeatable, and as a result amenable to correction using standard image conditioning techniques.

Figure 9:
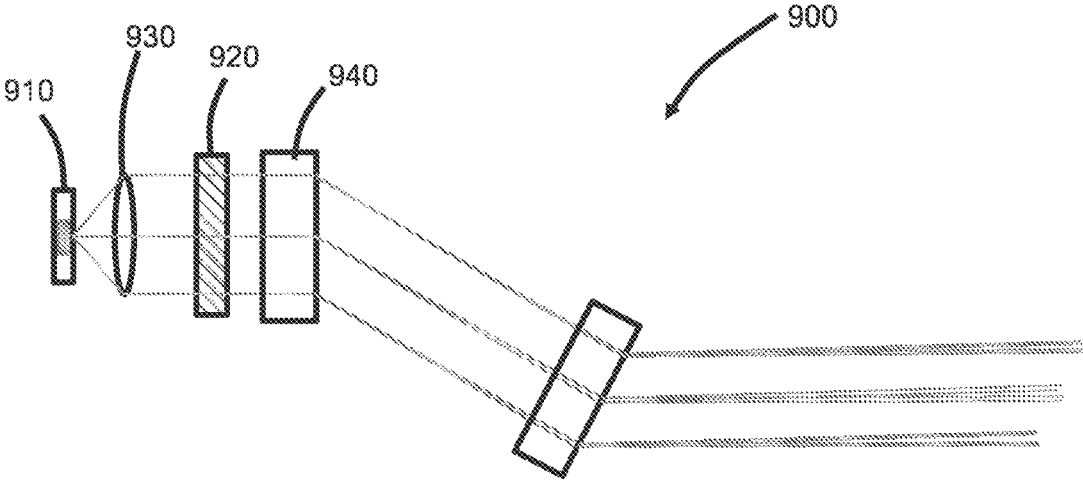
FIG. 9 is a schematic illustration of an imaging apparatus according to a fourth embodiment of the invention.

FIG. 9 is a schematic diagram of apparatus 900 for compiling an image from a number of image components. Apparatus 900 is similar to apparatus 200, and functions to compile an image in generally the same manner as described above in respect of apparatus 200. Those aspects of apparatus 900 which are similar to apparatus 200 will therefore not be described. Apparatus 900 differs from apparatus 200 in that the mirrors used to reduce noise falling on the detector 910 are not present. An etalon 920 is positioned between the lens 930, which focusses light onto the detector, and first acousto-optic deflector 940. In effect, etalon 920 functions as a narrowband filter, so that only light in a specific waveband reaches detector 910. For example, where detector 910 is a long wave infrared detector, etalon 920 is configured to transmit only light at a long wave infrared wavelength. Outside of the specific wavelength band, etalon 920 functions effectively as a mirror, and so also reduces noise photons incident on the detector in the same way as the mirrors 260, 270 in apparatus 200. In an alternative embodiment, mirrored baffles (equivalent to mirrors 260, 270) can be added to apparatus 900 so as to stop noise in the specific wavelength band transmitted by the etalon.

Figure 5:
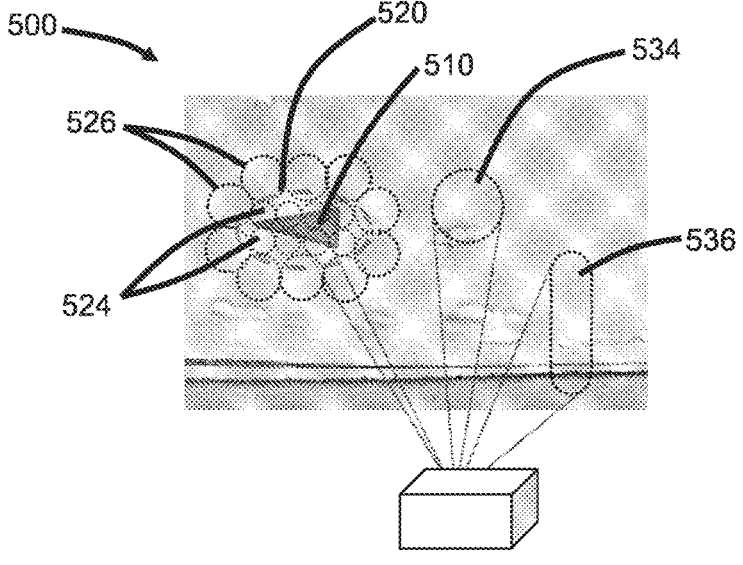
FIG. 5 is a schematic illustration of image components in a scene to be imaged using the apparatus of FIGS. 2 to 3.

FIG. 5 is a schematic illustration of a scene 500 imaged by apparatus 200, and shows various ways in which apparatus 200 can be controlled in order to form a composite image in an example of using the apparatus 200 to track or locate a target 510 in the scene 500. In FIG. 5, image components captured by the apparatus 200 are illustrated in dashed outlines. The overall size of scene 500 is determined by the field of regard of the apparatus 200.

Scene 500 includes a target object 510 that is set against a background of sky with some scattered clouds, over a low horizon. In one exemplary application, apparatus 200 may be operated by a user with some knowledge of where the target might be. In this case the user may identify a region in the scene, indicated generally by reference numeral 520, which region the target is believed to occupy. Apparatus 200 can for example operate so as to concentrate more particularly on region 520, to enable a high frame rate over the target so as to facilitate target tracking. In such a case a relatively larger number of image components overlay the target region, whilst a relatively smaller number of image components selectively sample other areas of the scene. This is illustrated by the dotted outline shapes 524, 526, 534, and 536 in scene 500, each of which indicate an image component of a single instantaneous field of view that may be compiled into a single composite image of the scene by subsequent processing.

A number of smaller dotted outline circles 524 overlay target 510 in region 520 of FIG. 5. Immediately outside of the perimeter of region 520, apparatus 200 may additionally capture image components such as those indicated by the larger circles 526. These larger image components can be obtained by appropriately changing the frequencies applied to both acousto-optic deflectors during the staretime for the image component, so as to widen the instantaneous field of view in two dimensions. The smaller image components 524 provide a relatively higher resolution of the target 510, whilst the large image components 526 provide a relatively lower resolution of the area surrounding the target 510. Where the imaging apparatus is used to track the target through a succession of images, in the event that the target moves out of the relatively higher resolution area covered by image components 524, the direction of its movement is expected to be discernible through analysis of the relatively lower resolution area covered by image components 526.

Apparatus 200 may additionally capture image components from other parts of scene 500, such as those parts indicated by reference numerals 534 and 536. These image components have a larger area than those around the perimeter of the target region 520, achieved by altering the frequency applied to the acousto optic deflectors over a larger frequency range for both acousto optic deflectors (component 534) during the staretime, or over a significantly larger frequency range for one acousto optic deflector only (component 536). Where the frequency of acoustic excitation is altered for only one acousto optic deflector rather than two, the image component is extended in one dimension only, rather than producing a circular image component. Image components obtained away from the anticipated target area may for example serve to characterise the background of the image, as may be useful in subsequent image analysis. As an alternative, since the frequency applied to the acousto-optic deflectors can be changed in discrete steps, rather than continuously, during the staretime, background characteristics could be obtained from a set of discrete positions in the field of regard in one image component. The dwell time for each of the discrete positions can also be controlled. Such an image component would, in broad terms, represent an average obtained from multiple separate points across the field of regard.

Figure 6:
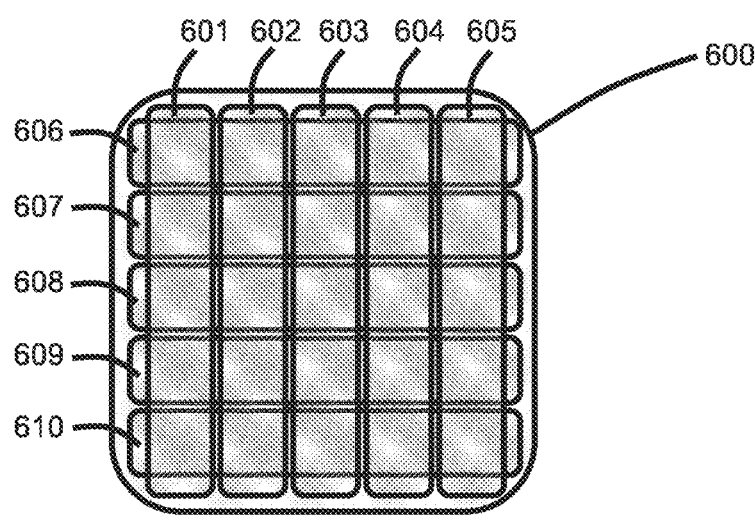
FIG. 6 is a schematic illustration of image components in a scene to be imaged using the apparatus of FIGS. 2 to 3.

FIG. 6 illustrates an exemplary method of imaging in which overlap of individual image components is structured so as to reduce the number of image components used to form the overall image. The method works in the case where the apparatus is being used to image a single object against a relatively uniform background. Ten image components 601, 602, 603, 604, 605, 606, 607, 608, 609, and 610 overlay a field of regard. Components 601, 602, 603, 604, and 605 are each approximately rectangular, having a length covering the height of the scene 600, and are distributed across the width of the scene 600. Components 606, 607, 608, 609, and 610 are also approximately rectangular, but are elongate in a direction perpendicular to that of components 601, 602, 603, 604, and 605, have a length covering the width of the scene 600, and are distributed across the height of the scene 600. The image components in this example are therefore a five by five grid of lines forming a lattice that covers the field of regard 600 in a grid of 25 points, each point being formed by the overlap on one image component with another.

Apparatus 200 can be used to measure the intensity in each of the image components 601, 602, 603, 604, 605, 606,

607, 608, 609, and 610. In a first step, to form those components distributed across the width of the scene 600, the detector measures the intensity received whilst the frequency applied to a first of the acousto-optic detectors is controlled within the staretime to elongate the image component along the height of the scene. For example, the frequency applied to the first of the acousto-optic deflectors may be continuously increased, or chirped, throughout the staretime. To form the subsequent components distributed across the width, the frequency applied to the second of the acousto-optic deflectors is then incremented from component to component. In a second step, to form those components distributed across the height of the scene 600, the detector measures the intensity received whilst the frequency applied to the second of the acousto-optic detectors is controlled to elongate the image component across the width of the scene. For example, the frequency applied to the second of the acousto-optic deflectors may be continuously increased, or chirped, throughout the staretime. To form the subsequent components distributed across the height, the frequency applied to the first of the acousto-optic detectors is then incremented from component to component.

Information relating to 25 points is thus obtained from only 10 measurements by using the information known about the scene, namely that it contains only one object. Similarly, but more generally, the process of Compressive Imaging can utilise known properties of real images to identify the actual image from the possible solutions offered by an undersampled image. For example, it is known that under certain transformations, such as the wavelet transform, the sparsity of the output is lower for real images than for images in which random values are ascribed to the points. The output image can therefore be taken to be that which is most sparse under a relevant transform. The ability to select the number of image components used to compile each composite image, the ability to control the size, shape, and position of those image components within the overall field of regard, and the ability to obtain image components captured form multiple and potentially separate positions within the field of regard, are ideally suited to the application of such compressive imaging techniques.

The apparatus can also be used to perform sightline stabilisation, when incorporated in a moving platform including appropriate sensors to detect sightline spin or vibration, such as inertial sensors. Sightline motion during image capture can result in image smear. The inertial sensors may for example comprise accelerometers or gyroscopes, or both accelerometers and gyroscopes. Stabilisation can be achieved by applying the inverse of the detected sightline motion to the deflector during the staretime. More specifically, in an exemplary embodiment addressing the deflector at 100 kHz, but capturing image components 10 kHz, there can be ten deflections for each image component. The inverse of the detected sightline motion can be applied to the deflector for each of those ten deflections, so that each deflection in fact captures the same point of the scene. In this case, the smear effect is limited to the period of the deflector change, rather than the period of the image component capture. For an exemplary imaging apparatus mounted on a missile, a missile sightline spin of ~1000 rpm would result in an image smear of only ~1 mrad.

Figure 7:
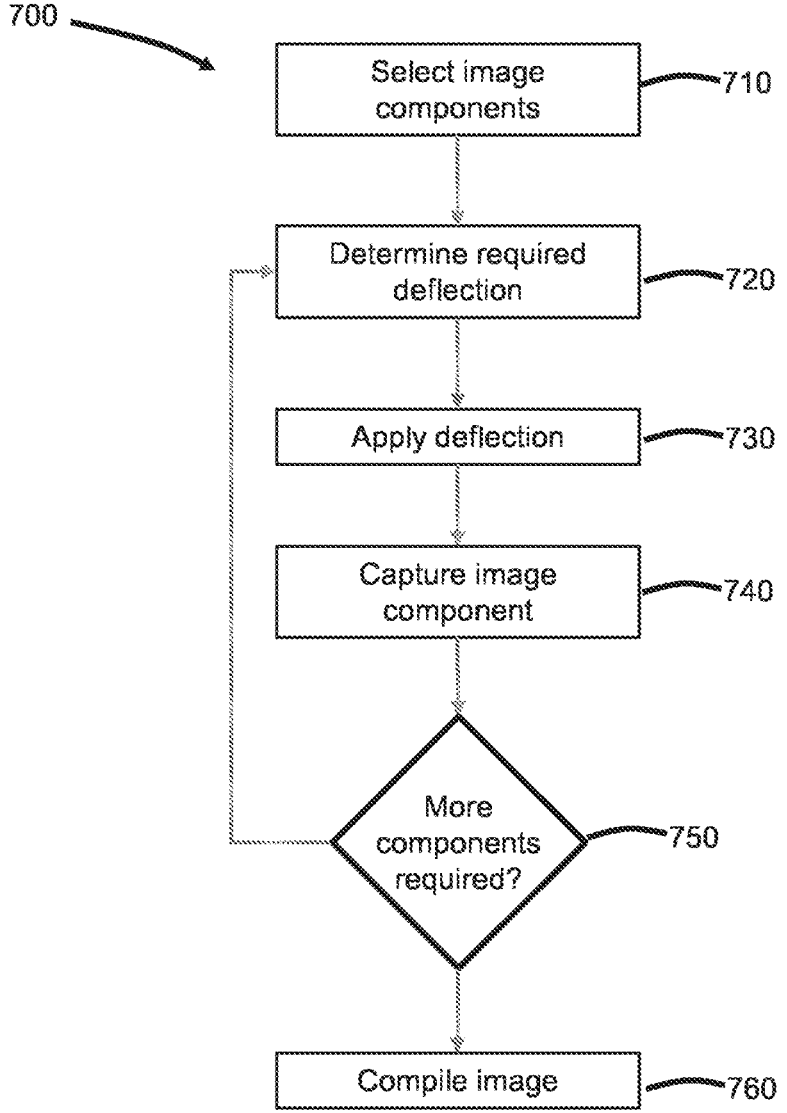
FIG. 7 is a flow diagram illustrating steps in a method according to an embodiment of the invention.

FIG. 7 is a flow diagram 700 illustrating a process for compiling an image using the apparatus 100, 200, or 300 in general terms. At a first step 710, image components are selected. The deflections that must be applied, for example by acousto-optic deflectors 210, 220, in order for those image components to be recorded by the detector are determined for each image component. At step 720, the next required deflection is determined. At step 740, the image component is captured. At step 750 it is determined whether any further image components are required. If more image components are required, the process returns to step 720. If the required number of image components has been obtained, the process moves to compile the image at step 760. The step of compiling the image may comprise a simple combination of the image components or, as described above, may involve further computation.

Figure 8:
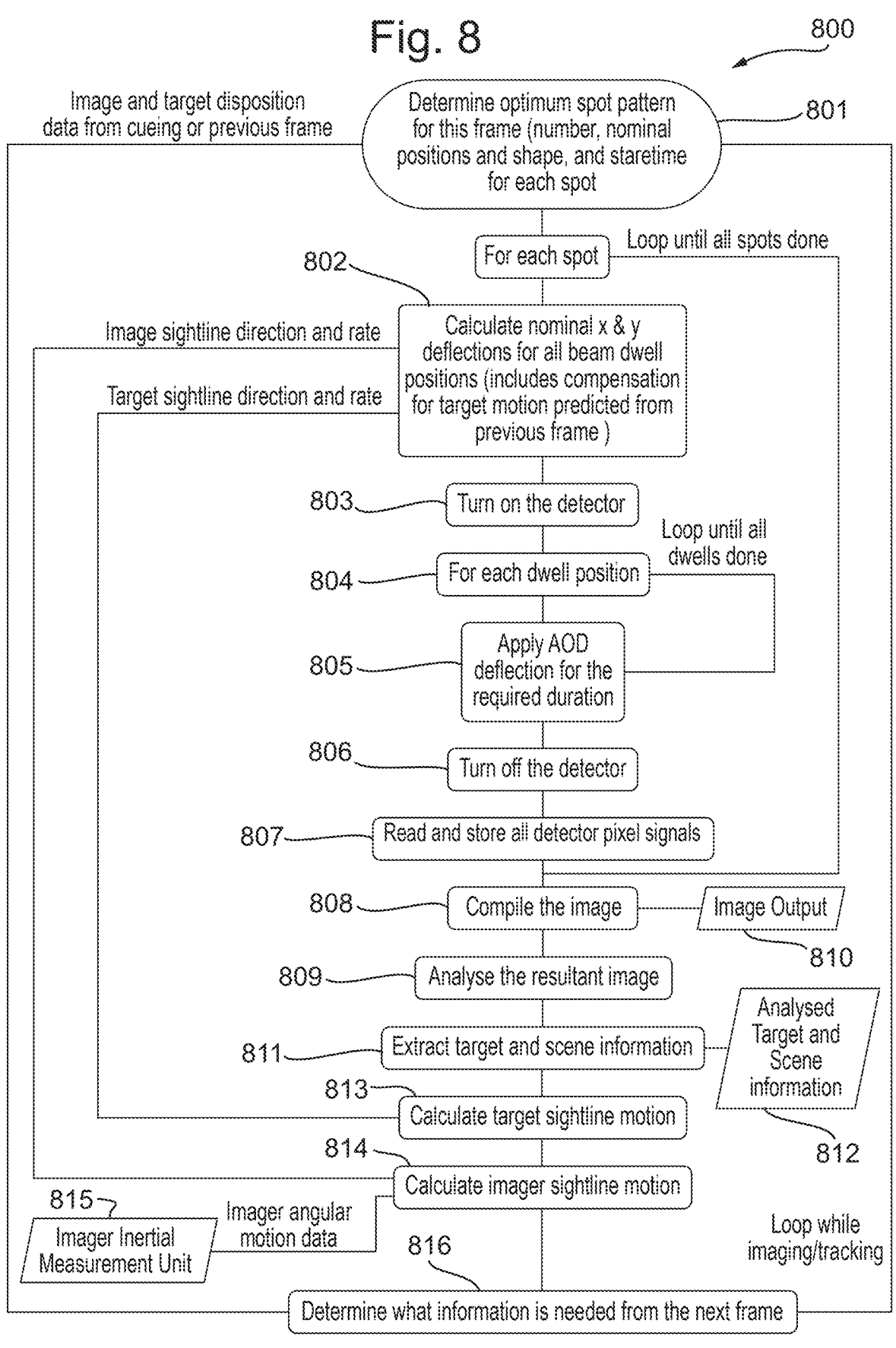
FIG. 8 is a flow diagram illustrating steps in the method of FIG. 7 in greater detail.

FIG. 8 is a flow diagram 800 illustrating in greater detail a method for using apparatus such as apparatus 100, 200 or 300 as part of a process for continuously tracking a particular target from a moving platform. In such a process a stream of frames is captured, and data from a previous frame may be used to determine in part how the next frame should be captured. At step 901, the pattern of image components to be used for the frame is determined. The determination may be performed on the basis of image and target disposition data obtained either from cueing, or from a previous frame. The number of image components, as well as the position, shape, and staretime for each spot is determined. The position at this step remains a nominal position, since the actual position may be varied during image component capture either to compensate for platform motion, or to enable a specific component shape to be captured.

Steps 802 to 807 are subsequently performed for each image component, the process looping until every image component has been captured. At step 802, x and y deflections for all beam dwell positions in the image component are calculated. The calculation makes use of image and target sightline direction and rate, obtained from previous frames. This enables the process to take account of target and platform motion in calculating the deflections for each dwell position in the image component. At step 803, the detector is turned on. At step 804, a required deflector position is selected. At step 805 the deflection is applied to the acousto optic deflectors for the required dwell time. Steps 804 and 805 run in a loop until the image component is complete, with no more deflections to apply. At step 806 the detector is turned off. At step 807 the detector pixels are read and stored. If there are further image components to capture, the process loops back to step 802 to capture the next image component.

Once all image components have been captured, at step 808 the image is compiled from the individual image components. This image is passed for analysis to step 809, and as an output 810. Various types of analysis may be performed on the image, in dependence on the specific application for which the process is being used. For example, known algorithms may be used to distinguish the target from the background, or to identify further potential targets in the scene. At step 811, relevant target and scene information is extracted. Such information may include for example target location in the scene, and/or averaged background intensity levels. The analysed target and scene information can be provided as an output to a user, or as an output to be stored, at step 812. At step 813, target sightline motion is calculated.

The moving platform from which the process 800 is operated is provided with an imager inertial measurement unit 815. This unit may be a specific unit provided with the imaging apparatus, or the output from a platform inertial measurement unit, such as a unit provided for navigation, may be used. The inertial measurement unit 815 provides the imager angular motion data. At step 816, this information is used to calculate the imager sightline motion. Image analysis data, target sightline motion data, and imager sightline motion data can then be used at step 816 to determine what information is needed from the next frame. The process then loops back to step 801.

Flow diagram 800 illustrates an imaging process under the control of a fully automated loop. It is alternatively possible for an operator to control a number of aspects of the control loop. An operator may be able to provide input to determine, for example, one or more of: the field of regard for the imaging apparatus; a region of interest within the field of regard; and a target for tracking. The operator can be provided with one or more displays showing the overall field of regard and particular regions of interest within the field of regard. The operator can also be provided with standard interface devices, such as touchscreens, keyboard, mouse, trackball, or joystick. Eye-tracking may also be used, as may vocal commands.

The operator can determine one or more regions of interest. A region of interest may be imaged with higher resolution, or at a higher frame rate, as discussed in further detail below. Each region of interest can include a plurality of image components. The control parameters for each region of interest can be defined geometrically, with a fixed position and size in the field of regard determined by the user; or responsively, with the operator designating a target that is subsequently automatically tracked. Targets may be designated, for example, by specifying a search radius, and selecting a candidate object, or selecting objects having at least a user-specified contrast level to background, within the radius of an identified point. Potential targets can be identified in the display, for example by means of a colour or intensity change, or by the use of cross-hairs or a surrounding circle. The operator may be able to confirm objects for objects for selection as targets. Object designation could also be by means of gaze detection.

A variety of methods are known for distinguishing and tracking objects within a stream of images. In addition to the tracking methods which are based on image content, targets or regions of interest may be based on eye tracking.

A number of parameters are relevant to each region of interest. These include shape. The shape of the region of interest may be regular, such as a rectangle or circle; a specified area enclosed by selected points; an irregular shape determined by the boundary of a tracked object, or the boundary of a tracked object extended by an operator-determined radius; or a combination of these. The size of the region of interest can be controlled as required by the user, up to the size of the overall field of regard. In the case of responsive regions of interest, the size may be determined automatically, for example so as to capture a target increasing in size in the scene, or to include two or more targets. The position of the region of interest, once designated, can be fixed in the field of regard for subsequent frames; or can be moveable under operator control; or centred or offset with respect to a tracked objects.

The operator can provide input to determine the resolution of the images obtained by the apparatus. The apparatus can increase the resolution by decreasing the spacing between image component centres and, where image component spacing is less than component size, apply super-resolution methods to further increase the resolution of the output image. The resolution may be uniform throughout the field of regard, or may be increased in a region of interest. Within a region of interest, the operator may select an algorithm to determine non-uniform resolution. For example, an initial sparse resolution can be captured, followed by capturing additional image components at, for example, high contrast areas; or areas of the region of interest that are more rapidly changing. Increased resolution enables the operator to more closely examine those sections of the image.

The operator can control the apparatus so as to zoom the image. Zoom is equivalent to changing both the resolution and size of a region of interest, such that the displayed image component density remains constant, whilst the area being viewed reduces. In this way the size of the displayed image stays the same, while its angular subtense reduces, so that the angular resolution of the displayed imaged improves.

The operator may also provide input to instruct the apparatus to use overlapping image components so as to enhance sensitivity, by averaging over areas of overlap. This effectively increases the dynamic range of an image. Responsive image component placement can be used to determine where component overlap should be used so as to increase sensitivity. The operator may for example select from a range of algorithms that can determine where image components should be placed and how overlaps should be used.

The operator may also provide input to determine the frame rate captured by the apparatus. Frame rate is dependent on the staretime, and on the number of image components captured in each frame. The frame rate can therefore be traded by the operator with image depth, number and size of regions of interest, local sensitivity, and resolution. Such trade-offs can be effected either purely by the operator input, or with some use of appropriate sampling control algorithms.

Variations and modifications to the above described embodiments will be apparent to the person skilled in the art. For example, in certain applications it may be desirable to include folding mirrors in the optical design so as to ensure that the apparatus remains compact. Compactness can be advantageous in, for example, aerospace applications, or where the apparatus is to be used as part of a missile seeker. The skilled person will also appreciate that alternative deflectors suitable to controllably deflect light can be used in place of the acousto-optic deflectors described above. Any available means to steer light can be used, subject to any constraints imposed by the speed with which it is necessary to obtain an image. Alternative exemplary deflectors include liquid crystal spatial light modulators, micro-mirrors, and single, preferably highly responsive, steerable mirrors. It may also be possible to use a single acousto-optic deflector operable to deflect light in two dimensions, instead of a combination of two acousto-optic deflectors. Alternative wavebands, such as the visible or medium wavelength infrared, can also be used. As with the choice of deflector, there may be constraints arising from the speed at which it is necessary to create image frames. In such alternative wavebands, it may also be desirable to replace the mirrored baffles described above with suitable alternatives. For example, in the visible band, it may be desirable to replace the mirrored baffles with baffles coated with a matte black material, or more highly absorbing coatings such as Vantablack®, made by Surrey Nanosystems.

It will be noted that not all imaging applications require fast image frame creation. For example, when viewing a static or slowly varying scene, a very slow rate of image frame creation may be acceptable. In such a case, a relatively slow deflector can be used, and there may be more flexibility to select alternate wavebands. To obtain a high enough frame rate for missile applications, such as the use of the imaging apparatus in a missile seeker, the high responsiveness of acousto optic deflectors, combined with the short staretimes facilitated by LWIR, are advantageous. Using an acousto-optic deflector in the LWIR waveband is expected to result in sample times (the time taken to acquire one image component) of the order of 10 µs-100 µs. The lower limit is determined by the speed at which the acousto optic deflector can change its deflection (100 kHz or greater), whilst the upper limit is related to the time necessary to achieve an appropriate signal to noise ratio, and may depend on the scene under observation.

Whilst, in the above, it has been described to use a narrow band system, in that each image component relates to a specific narrow wavelength band, those skilled in the art will also appreciate that wider band systems may be possible if additional optical components, such as prisms, are used to compensate for dispersion arising in the acousto-optic deflectors. Wide band systems may also be possible using alternative, non-dispersive deflection means. In addition, a wider spectral range could be imaged using the above described apparatus 900 if a tuneable filter, such as a tuneable etalon, is used in conjunction with a relatively wideband detector. Images could then be obtained at a variety of wavelengths, allowing further flexibility in subsequent image processing.

Those skilled in the art will also appreciate that the apparatus can be modified to work at other wavelength bands through use of alternative detectors.

Whilst, in the above, it has been described to use a single pixel detector, it will also be appreciated that multi-pixel detectors could be used. For example, a small array of pixels, such as an array of pixels 3 by 3 pixels, an array of 5 by 5 pixels, or an array of 20 by 20 pixels could be used. It may be that an array of 1000 pixels could be used. As the number of pixels increases, the information available from each image component increases. The instantaneous field of view also increases, and, as a result, the design of the optics becomes more complex, in particular in respect of the use of mirrors to improve the signal to noise ratio as described above. Small pixel arrays of order 10 by 10 pixels are expected to work well.

It will also be appreciated that it may be necessary to reduce the effects of chromatic aberration in the apparatus described above. In some examples it will be possible to ignore this effect and operate the system to obtain a blurred, and therefore relatively coarse image as a result of the chromatic aberration. Alternatively one or more of a number of options can be used to mitigate or reduce the effects of chromatic aberration.

A first option is to characterise the degree of blur during manufacture of the apparatus, and use that information to computationally sharpen the image, for example using computational imaging or artificial intelligence techniques applied in subsequent processing. A notch filter, positioned in front of the detector, can be used in addition to, or as an alternative to, the use of such computational techniques. Preferably the notch filter is reflective. Use of a variable notch filter may provide advantages to the system in certain applications. Increasing the bandwidth of the notch improves the signal, and hence the signal to noise ratio; but will degrade the resolution. This provides the operator with a further real-time trade-off in performance parameters that will enable optimisation of the apparatus in use for a variety of applications. A variable notch can be implemented for example using a selectable filter wheel. The filter wheel is provided with a number of notch filters, and can be rotated to bring any one of the filters into the optical axis.

Other types of filter can also be used. Electronically controlled filters have the advantage that they do not contain moving parts. For example, graphene metasurface nanoan-tennas can be used as voltage controlled LWIR filters. Such filters are disclosed by Neelam Gupta, Robert Magnusson, and Mark Lucente in "Longwave infrared tunable notch filters", Proc. SPIE 11723, Image Sensing Technologies: Materials, Devices, Systems, and Applications VIII, 117230B (12 Apr. 2021), available from https://doi.org/10.1117/12.2596261.

It is also possible to use a detector with an inherently narrow bandwidth, but very high response. For example, a resonant cavity detector, in which the detector is positioned within a resonant structure such as a Fabry-Perot etalon, can be used. These detectors are also expected to have the advantage of being operable in the higher temperature ranges, for example between 150 K and 200 K, that are achievable with a thermoelectric cooler. Typically, cooled detectors operate at a temperature of approximately 80 K. The increased temperature of the resonant cavity detector reduces the effectiveness of the use of mirrors as baffles, described above, but noise reduction is still achieved because the detector remains colder than the other components of the apparatus.

A further option is the use of a small, but multi-pixel and multi-colour detector, in which each pixel responds to one of two, three, or more different, narrow wavebands. In this way an independent, sharp image can be created in each waveband. Computationally these can be combined into a sharper image, and, in addition, make a multispectral image.

Finally, it should be clearly understood that any feature described above in relation to any one embodiment may be used alone, or in combination with other features described, and may also be used in combination with one or more features of any other of the embodiments, or any combination of any other of the embodiments. In particular it should be noted that in all of the above embodiments, the processor hardware may be built specifically for the purpose of controlling apparatus, or, particularly if the apparatus is to be operated in a missile or other aerospace or vehicle platform, may be firmware installed on a platform processor; or the processor may be a general purpose computer with software installed to control the apparatus as described above.

The invention claimed is:

1. Apparatus for compiling an image, the apparatus comprising:
   a) a deflector operable to deflect light incident thereon by a controllable angular deflection and arranged to receive light from a field of view, which field of view is moveable within a field of regard by controlling the angular deflection;
   b) a detector arranged to receive deflected light from the deflector and operable to output an image component composed from the deflected light; and
   c) a processor arranged to control at least one of a staretime for each image component or dwell times for the deflector within the staretime for each image component such that a size of each image component with respect to the field of regard is variable, whereby the control selects a part of the field of regard to be received at the detector for each image component, and to receive a sequence of such image components from the detector;
   wherein the apparatus is configured to receive each image component passively, and wherein the processor is operable to compile the sequence of image components to form a composite image of at least a part of the field of regard.

2. The apparatus as claimed in claim 1, wherein the deflector comprises one or more acousto-optic deflectors.

3. The apparatus as claimed in claim 2, wherein the deflector comprises two acousto-optic deflectors immediately adjacent one another.

4. The apparatus as claimed in claim 2, wherein the deflector comprises two spaced apart acousto-optic deflectors, and further comprises a relay lens between the two spaced apart acousto-optic deflectors arranged to focus light deflected by one of the acousto-optic deflectors onto the other of the acousto-optic deflectors.

5. The apparatus as claimed in claim 2, wherein the deflector comprises a single acousto-optic deflector operable to deflect light across a two dimensional field of regard.

6. The apparatus as claimed in claim 2, further comprising one or more stops arranged to prevent light passing through the one or more acousto-optic deflectors without deflection from reaching the detector.

7. The apparatus as claimed in claim 6, wherein the one or more stops comprises one or more mirrors arranged such that an image of the detector is formed at the detector.

8. The apparatus as claimed in claim 6, wherein the one or more stops comprises an arrangement of mirrors configured to retroreflect rays originating at the detector.

9. The apparatus as claimed in claim 1, further comprising a filter configured to filter light incident on the detector.

10. The apparatus as claimed in claim 9, wherein the filter is a variable filter.

11. The apparatus as claimed in claim 1, wherein the detector is configured to detect radiation in a long wavelength infrared band.

12. The apparatus as claimed in claim 1, wherein the detector comprises between one and one thousand pixels.

13. The apparatus as claimed in claim 12, wherein the detector is a single pixel detector.

14. The apparatus as claimed in claim 12, wherein the deflector is operable such that a first field of view recorded by a first image component is displaced from a second field of view recorded by a second image component by a non-integer number of pixels.

15. The apparatus as claimed claim 1, wherein the detector comprises a number of pixels each operable to detect a different wavelength of electromagnetic radiation.

16. The apparatus as claimed in claim 1, wherein the detector is cooled.

17. The apparatus as claimed in claim 1, wherein at least the detector and the deflector are mounted on a gimbal.

18. The apparatus as claimed in claim 1, further comprising an optical arrangement configured to alter the field of regard.

19. The apparatus as claimed in claim 18, wherein the optical arrangement comprises an afocal telescope configured to expand the field of regard.

20. The apparatus as claimed in claim 1, further comprising a sensor arranged to detect motion of the apparatus and to output detected motion to the processor; and wherein the processor is configured to control the angular deflection so as to compensate for the detected motion.

21. A seeker for a guided missile comprising the apparatus as claimed in claim 1.

22. A passive imaging method for compiling an image, the method using apparatus comprising a detector arranged to receive deflected light from a deflector; the deflector being operable to deflect light incident thereon by a controllable angular deflection, and arranged to receive light from a field of view, which field of view is moveable within a field of regard by controlling the angular deflection; and the method comprising the steps of:

selecting a number of image components;

for each image component, determining a staretime and dwell times, wherein at least one of the staretime and the dwell times of the deflector within the staretime for each image component is variable such that a size of the image component with respect to the field of regard is variable between image components;

determining the deflection required to enable the detector to image each of said image components based on the staretime and the dwell times determined for each image component;

for each determined deflection, applying the deflection to light incident on the apparatus and using the detector to record the image component associated with the deflection; and compiling the image components to form a composite image of at least a part of the field of regard.

23. The method as claimed in claim 22, wherein the deflection is varied during recording of at least one of the image components.

24. The method as claimed in claim 23, wherein the deflection takes a number of discrete values during recording of said at least one of the image components, such that said at least one of the image components relates to a set of discrete regions of the field of regard.

25. The method as claimed in claim 24, wherein the deflection is maintained at each discrete value for a set dwell time, and wherein the method further comprises the step of selecting the dwell time-times for each of the discrete values, respectively.

26. The method as claimed in claim 25. wherein the dwell time is the same for each of the discrete values.

27. The method as claimed in claim 23, wherein the deflection is varied continuously during recording of said at least one of the image components.

28. The method as claimed in claim 22, wherein the deflection takes a number of discrete values during recording of at least one of the image components, and where the deflection is varied continuously during recording of at least another of the image components.

29. A method of capturing video, the video comprising a sequence of image frames, wherein each of the sequence of image frames is a composite image obtained using the method of claim 22.

30. The method as claimed in claim 29, wherein the step of determining the deflection required to enable the detector to image each of said image components for one of the image frames comprises the steps of determining motion of the apparatus, and determining the deflection so as to compensate for the motion of the apparatus.

31. The method as claimed in claim 29, further comprising the step of tracking a target in the sequence of image frames, and wherein the step of selecting the image components for one of the image frames is performed in dependence on motion of the tracked target determined from a number of preceding image frames.

32. A computer readable medium comprising instructions that when executed cause a processor to perform the method of claim 22.

33. The apparatus as claimed in claim 1, wherein the processor is configured to control the deflector during recording image components such that the composite image includes gaps in the field of regard.

* * * * *